P. A. CUSTER.
CORN PLANTER.
APPLICATION FILED MAR. 6, 1911.
1,004,854.
Patented Oct. 3, 1911.
3 SHEETS—SHEET 1.
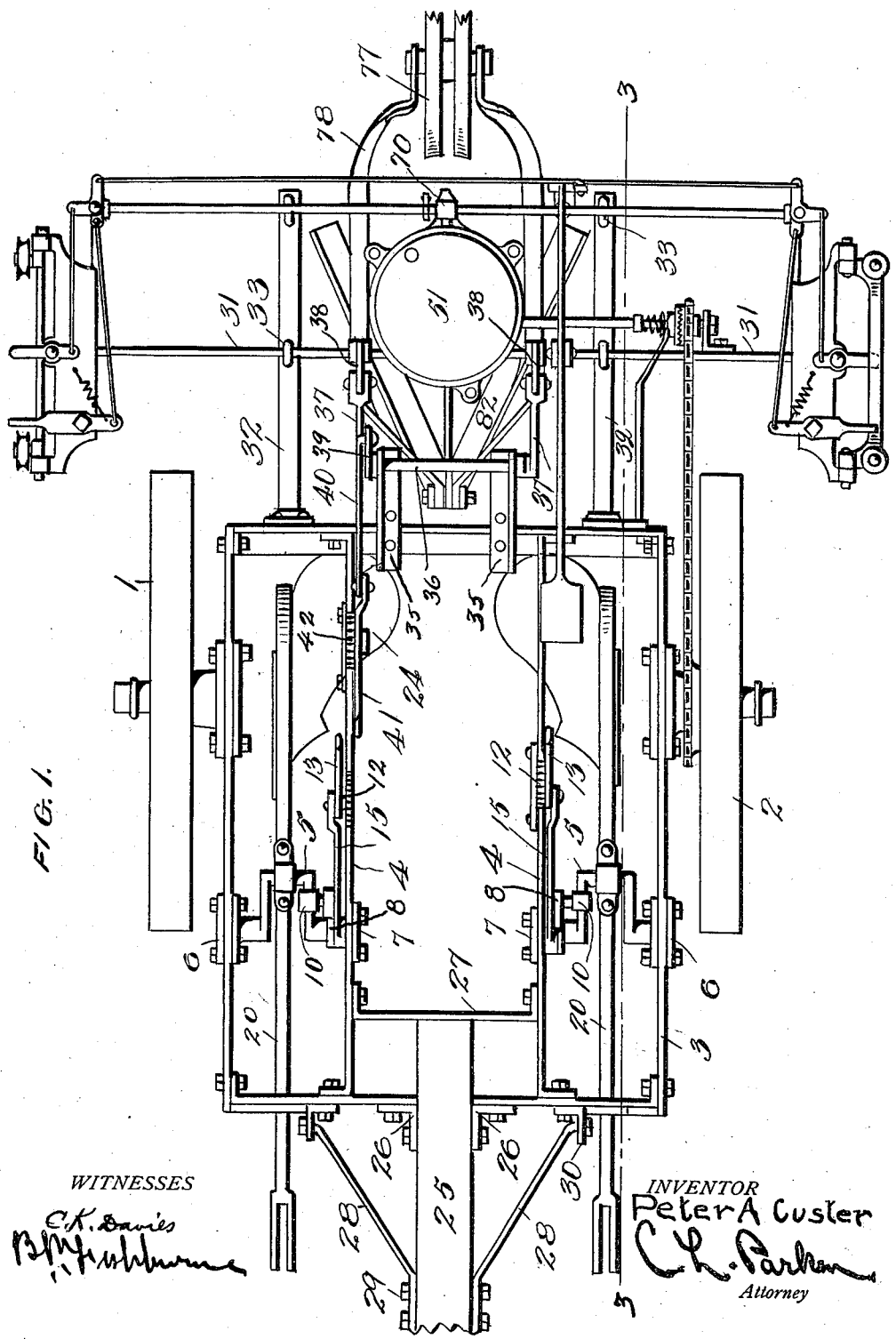

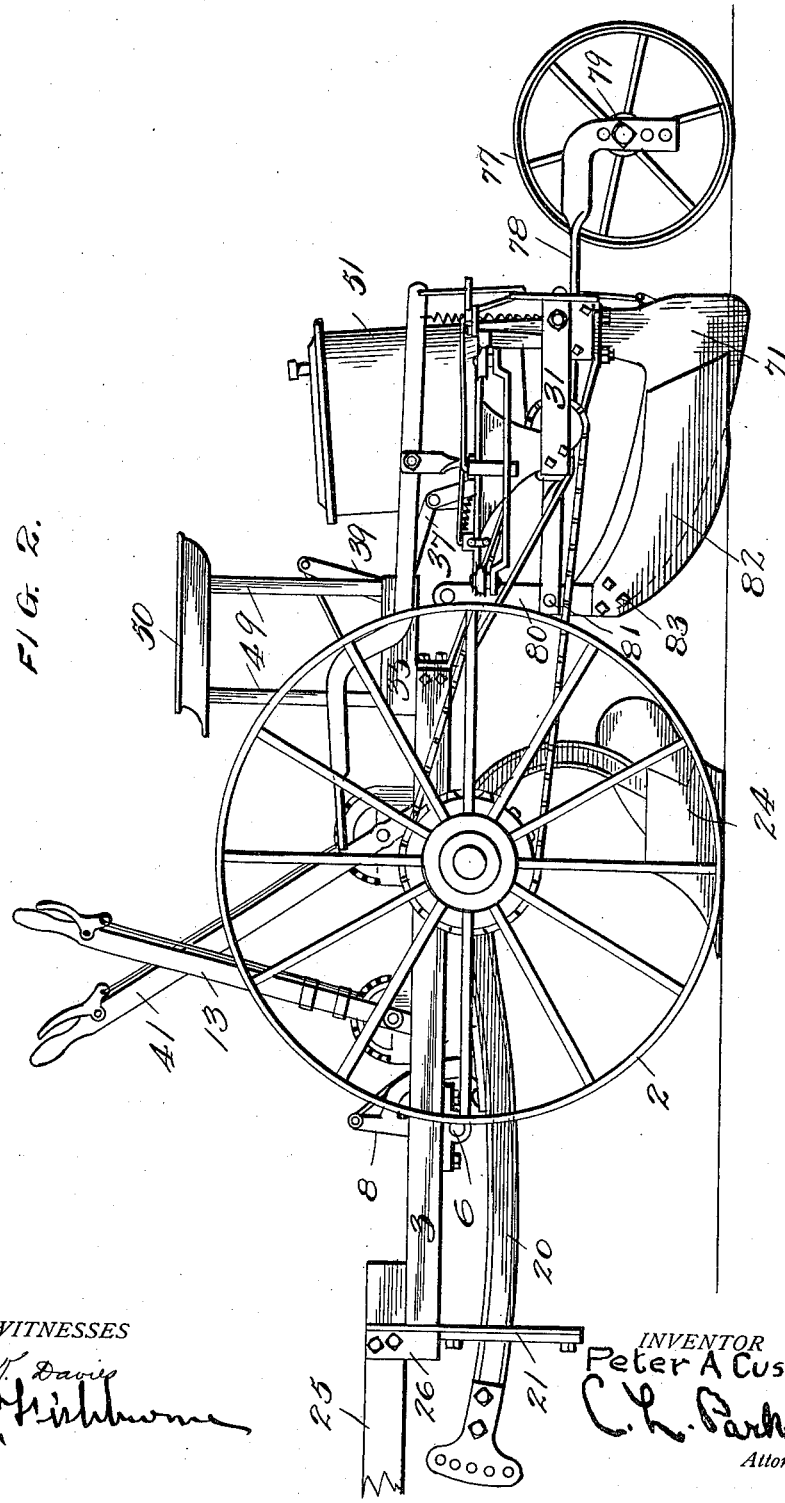

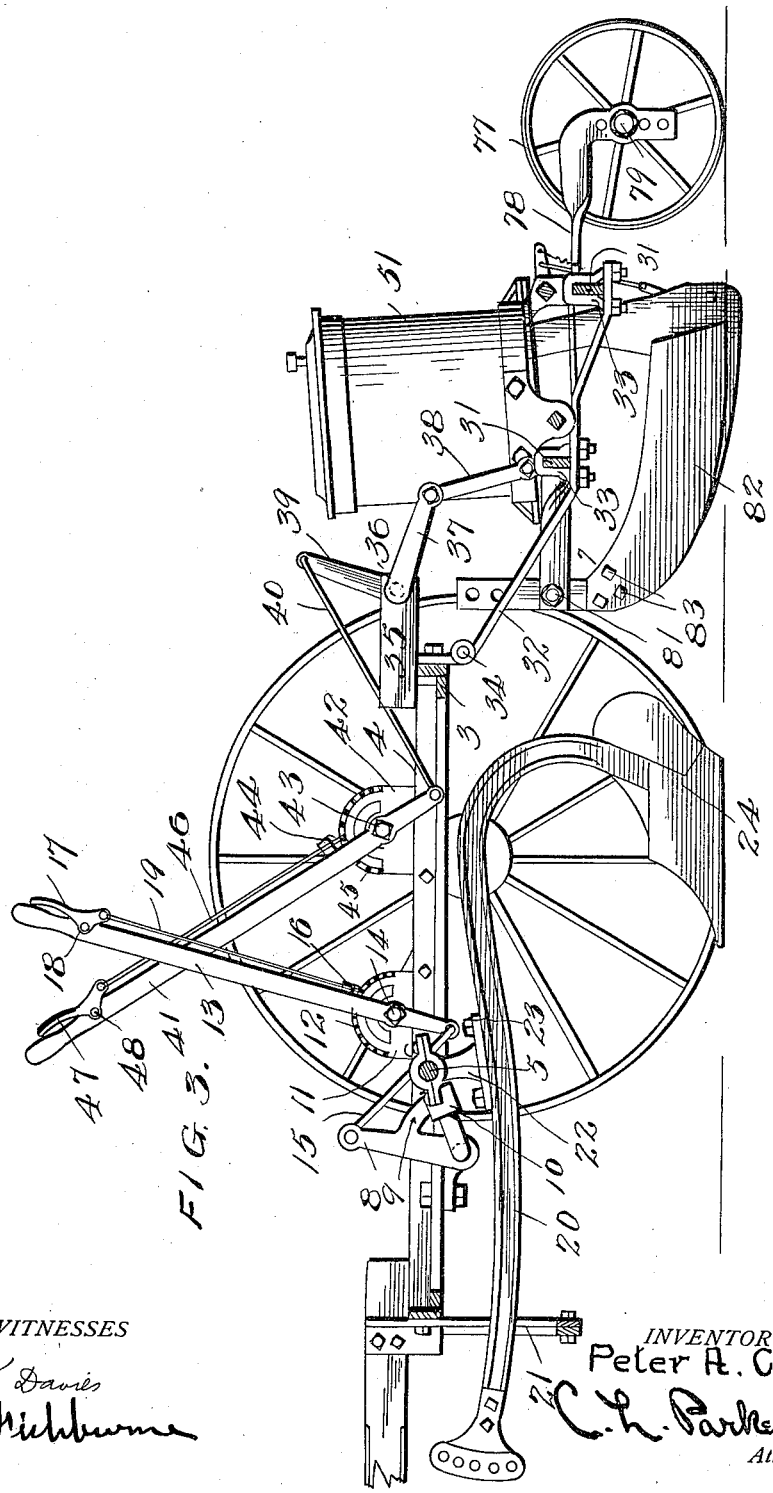

UNITED STATES PATENT OFFICE.

PETER A. CUSTER, OF WOODRIVER, ILLINOIS.

CORN-PLANTER.

1,004,854.   Specification of Letters Patent.   Patented Oct. 3, 1911.

Application filed March 6, 1911. Serial No. 612,511.

*To all whom it may concern:*

Be it known that I, PETER A. CUSTER, a citizen of the United States, residing at Woodriver, in the county of Madison and State of Illinois, have invented certain new and useful Improvements in Corn-Planters, of which the following is a specification.

My invention relates to machines for planting corn, or other grain and more particularly to check-row planters.

An important object of this invention is to provide a planter, which will throw up two opposing rows, to form a hill, level off the hill or row, form an opening in the leveled hill and then deposit the seed at regular spaced intervals in said opening.

A further object of this invention is to provide a planter which is highly capable of fulfilling the purpose for which the same is devised.

Other objects and advantages of this invention will be apparent during the course of the following description.

In the accompanying drawings forming a part of this specification, and in which like numerals are employed to designate like parts throughout the same, Figure 1 is a plan view of my improved planter, Fig. 2 is a side view of the same, and Fig. 3 is a vertical longitudinal sectional view taken on line 3—3 of Fig. 1.

In the drawings wherein is illustrated a preferred example of my invention, the numerals 1, and 2 designate traction wheels, which are suitably connected with and support a preferably rectangular main frame 3. These traction wheels are connected with the main frame near the rear end thereof. Disposed within the main frame 3 are longitudinal strips 4, rigidly connected with said main frame and spaced from the longitudinal sides thereof, as shown. Crank shafts 5 are provided, which are disposed between the longitudinal strips 4 and the longitudinal sides of the main frame, as shown. These crank shafts are mounted within journal boxes 6 and 7, which are suitably connected with the longitudinal sides of the main frame 3 and the longitudinal strips 4, respectively. Pivotally mounted upon the inner ends of the crank shafts 5 are upstanding levers 8, carrying downwardly extending curved arms 9. These curved arms are connected with the crank portions of the shafts 5 by means of clamps 10. Suitably mounted upon the longitudinal strips 4 and to the rear of the crank shafts 5 are vertically disposed supports 11, having their upper ends cut in the arc of a circle and pro- vided with teeth 12. Operating levers 13 are pivoted intermediate their ends to the supports 11, as shown at 14. The lower ends of the operating levers have pivotal connection with links 15, extending upwardly for pivotal connections with the upper ends of the upstanding levers, as shown. Each of the operating levers carries a reciprocatory latch 16, adapted to engage and disengage the teeth 12. This latch is moved by a lever 17 pivotally connected with the operating lever, as shown at 18 and connected with said latch by a rod 19 or the like. Disposed below the crank shafts 5 are plow beams 20, extending longitudinally of the main frame 3 and having their forward ends operating within depending guide brackets 21, which are suitably secured to the forward end of said main frame. The plow beams 20 have upstanding brackets 22 rigidly connected to the same intermediate the ends thereof, by means of bolts 23, or the like. These upstanding brackets are pivotally connected with the crank shafts 5, as shown.

From the construction of the above referred to parts, it is obvious that the plow beams 20 are independently and vertically movable, such movements being effected by the oscillation of the operating levers 13. The plow beams 20 carry plow shares 24, which are suitably secured to the lower ends thereof and are adapted to throw two rows of earth inwardly toward each other for forming a hill or row. The forward end of the main frame 3 has connection with a tongue 25, which is secured thereto by means of angle-irons 26. This tongue is connected with a transverse strip or brace 27, which is connected with the longitudinal strips 4, as shown. The tongue 25 has connection with diagonal brace rods 28, as shown at 29, which brace rods are suitably connected with angle-irons 30, carried by the main frame 3.

Disposed at the rear of the main frame 3 is an auxiliary preferably rectangular frame 31, which is adapted to be oscillated in a vertical plane. The auxiliary frame 31 is connected with a pair of downwardly curved bars 32, as shown at 33. These bars are preferably disposed below the auxiliary frame 31. The bars 32 extend forwardly and upwardly for pivotal connection with the rear end of the main frame 3, as shown at 34 (see Fig. 3). Suitably mounted upon the rear end of the main frame 3 are horizontal angle-irons 35, which are rigidly connected with the main frame by any desired means. A rock-shaft 36 is journaled through these angle-irons, said rock-shaft being provided at its opposite ends with depending cranks 37. These cranks have pivotal connection with links 38, having their lower ends pivotally connected with the forward side of the auxiliary frame 31, as shown. The rock-shaft 36 is further provided near one end thereof with an upstanding crank 39, to the upper end of which is pivotally connected a link 40, having its forward end pivotally connected with an operating lever 41. This operating lever is pivoted intermediate its ends with a support 42, as shown at 43. The support 42 is suitably mounted upon the longitudinal strip 4. The operating lever 41 carries a reciprocatory latch 44 adapted to engage teeth 45 formed upon the upper end of the support 42. The latch 44 is moved by a rod 46, the upper end of which has pivotal connection with a lever 47, which is pivoted upon the operating lever 41, as shown at 48.

From the description of the above referred to parts, it is obvious that the auxiliary frame 31 may be raised and lowered by the oscillation of the operating lever 41. The angle-irons 35 support uprights 49, upon the upper ends of which is suitably mounted a seat 50.

Suitably mounted upon the auxiliary frame 31 is a hopper 51 to hold the grain to be planted. This hopper discharges into a depending chute 70, to the lower end of which is suitably connected a furrow opener 71. It is to be understood that suitable means may be provided for properly regulating the amount of grain fed from the hopper 51 into the chute 70.

Disposed to the rear of the chute 70 is a caster-wheel 77, which is rotatably mounted between a pair of rearwardly extending bars 78, said caster-wheel being disposed upon an axle 79 connecting the pairs of bars. The bars 78 extend forwardly and are connected with an upstanding bar 80, as shown at 81. The bars 78 extend above and below the longitudinal sides of the auxiliary frame 31 and are secured to the same by suitable clamps. The upstanding bar 80 is suitably connected with the forward end of the furrow opener 71. Disposed forwardly of the furrow opener 71 is a sweep or leveler 82, having its forward end suitably secured to the upright bar 80, as shown at 83.

In the operation of my machine, the same is drawn forwardly by horses or other means, whereby the shares 24 throw up two rows for forming a hill. The sweep 82 then levels off the hill which is subsequently provided with a furrow by means of the furrow opener 71. The seed is supplied from the hopper 51 through the chute 70 and is deposited in the furrow at suitable intervals. The caster-wheel 77 follows after the furrow opener 71 to cover and pack the grain.

I wish it understood that the form of my invention herewith shown and described is to be taken as a preferred example of the same, and that certain changes in the shape, size and arrangement of parts may be resorted to without departing from the spirit of my invention or the scope of the subjoined claims.

Having thus described my invention, I claim:—

1. In a corn planter, a wheeled frame, plows suitably supported by the same for throwing up a hill, an auxiliary frame having connection with the first named frame, a sweep disposed rearwardly of said plows and having connection with the auxiliary frame, a furrow opener disposed rearwardly of said sweep and having connection with said auxiliary frame, and means to raise and lower said auxiliary frame.

2. In a corn planter, a wheeled main frame, plows suitably supported by the same for throwing up a hill, an auxiliary frame having connection with said main frame, a sweep disposed rearwardly of said plows and having connection with the auxiliary frame, a furrow opener disposed rearwardly of said sweep and having connection with said auxiliary frame, means for raising and lowering said auxiliary frame including an operating lever, and means to hold said operating lever in adjustment at different positions.

3. In a corn planter, a wheeled main frame, plows suitably supported by the same for throwing up a hill, an auxiliary frame disposed to the rear of and having connection with said main frame, a sweep disposed rearwardly of said plows and having connection with the auxiliary frame, a furrow opener disposed rearwardly of said sweep and having connection with said auxiliary frame, a caster-wheel disposed rearwardly of said furrow opener, means connecting said auxiliary frame and caster-wheel whereby the latter may be supported by the former, and means to raise and lower said auxiliary frame.

4. In a corn planter, a wheeled main frame, plow-carrying beams connected with the same, means to raise and lower said plow-carrying beams, an auxiliary frame disposed to the rear of and having connection with said main frame, a sweep disposed rearwardly of said plow carrying beams and having connection with said auxiliary frame, a furrow opener disposed rearwardly of said sweep and having connection with said auxiliary frame, and means to raise and lower the auxiliary frame.

5. In a corn planter, a wheeled main frame, plow-carrying beams connected with the same, means to independently raise and lower each of said beams, an auxiliary frame disposed to the rear of and having connection with said main frame, a sweep disposed rearwardly of said plow-carrying beams and having connection with said auxiliary frame, a furrow-opener disposed rearwardly of said sweep and having connection with said auxiliary frame, means for raising and lowering said auxiliary frame including an operating lever, and means to hold said lever in adjustment at different positions.

6. In a corn planter, a wheeled main frame, plow-carrying beams supported thereby, an auxiliary frame disposed rearwardly of said main frame, bars connected with said auxiliary frame and having pivotal connection with said main frame, means disposed upon said main frame for raising and lowering the auxiliary frame, a sweep disposed rearwardly of said plow-carrying beams and supported by said auxiliary frame, and a furrow opener disposed rearwardly of said sweep and having connection with said auxiliary frame.

7. In a corn planter, a wheeled main frame, an auxiliary frame disposed to the rear of the same, means pivotally connecting said frames, plow-carrying beams supported by said main frame, a sweep and furrow opener supported by said auxiliary frame, a rock-shaft suitably mounted upon the main frame and provided with a crank portion, means connecting said crank portion with the auxiliary frame, and means to turn said rock-shaft including an operating lever disposed upon said main frame.

8. In a corn planter, a wheeled frame, plow-beams connected with the same and carrying oppositely faced plow-shares to throw up two rows of earth for forming a hill, means to raise and lower the plow-beams, a sweep disposed rearwardly of the plow-shares to level off the hill, an auxiliary frame connected with the wheeled frame and disposed rearwardly of the plow-shares, a furrow opener disposed rearwardly of the sweep and connected with the auxiliary frame, a hopper discharging into the chute, and means to raise and lower the auxiliary frame.

9. In a corn planter, a wheeled frame, plow carrying beams supported thereby, crank shafts journaled through the wheeled frame, means pivotally connecting the crank portions of said crank shafts with the plow carrying beams, levers connected with the crank shafts and having laterally extending arms attached to the crank portions of said crank shafts, operating levers pivotally mounted intermediate their ends upon the wheeled frame, links connecting the lower ends of the operating levers and the upper ends of the first named levers, a sweep connected with the wheeled frame and disposed rearwardly of the plow carrying beams, and a furrow opener disposed rearwardly of the sweep and connected with said wheeled frame.

10. In a corn planter, a wheeled frame, plow carrying beams mounted therebelow, means connecting the plow carrying beams and wheeled frame, means to operate the first named means to raise and lower the plow carrying beams, an auxiliary frame disposed rearwardly of the wheeled frame, straps pivotally connecting the two frames to permit said auxiliary frame to be swung in a substantially vertical plane, a rock-shaft mounted upon said wheeled frame and provided with cranks, links pivotally connecting the cranks with said auxiliary frame, means mounted upon said wheeled frame to turn the rock-shaft, a sweep disposed below the auxiliary frame and attached thereto, a furrow opener disposed below the auxiliary frame and rearwardly of said sweep, a caster wheel disposed rearwardly of said auxiliary frame, and means mounted upon said auxiliary frame serving as a journal for said caster wheel.

In testimony whereof I affix my signature in presence of two witnesses.

PETER A. CUSTER.

Witnesses:
N. J. JORDAN,
RILEY OWEN.

Copies of this patent may be obtained for five cents each, by addressing the "Commissioner of Patents, Washington, D. C."